United States Patent
Li et al.

(10) Patent No.: US 9,825,321 B2
(45) Date of Patent: Nov. 21, 2017

(54) SELF-BIASED AND SUSTAINABLE MICROBIAL ELECTROHYDROGENESIS DEVICE

(71) Applicant: THE REGENTS OF THE UNIVERSITY OF CALIFORNIA, Oakland, CA (US)

(72) Inventors: Yat Li, Santa Cruz, CA (US); Hanyu Wang, Santa Cruz, CA (US); Gongming Wang, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 156 days.

(21) Appl. No.: 14/896,745

(22) PCT Filed: Jun. 12, 2014

(86) PCT No.: PCT/US2014/042091
§ 371 (c)(1),
(2) Date: Dec. 8, 2015

(87) PCT Pub. No.: WO2014/204772
PCT Pub. Date: Dec. 24, 2014

(65) Prior Publication Data
US 2016/0111747 A1  Apr. 21, 2016

Related U.S. Application Data

(60) Provisional application No. 61/837,572, filed on Jun. 20, 2013.

(51) Int. Cl.
*H01M 8/16* (2006.01)
*H01M 8/02* (2016.01)
*H01M 14/00* (2006.01)

(52) U.S. Cl.
CPC ............... *H01M 8/16* (2013.01); *H01M 8/02* (2013.01); *H01M 14/005* (2013.01)

(58) Field of Classification Search
CPC .......................... H01M 8/16; H01M 14/005
See application file for complete search history.

(56) References Cited

U.S. PATENT DOCUMENTS

| | | | | |
|---|---|---|---|---|
| 4,117,202 A | * | 9/1978 | Beck | ............ H01M 8/16 429/111 |
| 4,215,182 A | * | 7/1980 | Ang | ............ H01M 8/18 429/111 |

(Continued)

*Primary Examiner* — Matthew Merkling
(74) *Attorney, Agent, or Firm* — Lumen Patent Firm

(57) ABSTRACT

A hybrid photoelectrochemical and microbial fuel cell device is provided that includes a single-chamber photoelectrochemical device having an n-type $TiO_2$ photoanode and a Pt counter electrode in an aqueous electrolyte solution, and a dual-chamber microbial fuel cell having an anode chamber and a cathode chamber separated by a cation exchange membrane, where the anode chamber includes a carbon anode and microorganisms and the cathode chamber includes Pt-loaded carbon cathode, the carbon anode is electrically connected to the Pt counter electrode, the carbon cathode is electrically connected to the $TiO_2$ photoanode, a light source creates photoexcited electron-hole pairs at the photoanode, the holes oxidize water into oxygen, where dissolved oxygen in the cathode chamber is reduced, the microorganisms oxidize and produce bioelectrons, where the bioelectrons are transferred to the Pt electrode and reduce protons to form hydrogen gas.

9 Claims, 8 Drawing Sheets

(56) References Cited

U.S. PATENT DOCUMENTS

| | | | | |
|---|---|---|---|---|
| 2010/0200049 | A1* | 8/2010 | Kufryk | C12P 3/00 |
| | | | | 136/252 |
| 2010/0224246 | A1* | 9/2010 | Tender | H01M 8/0606 |
| | | | | 136/256 |
| 2010/0304458 | A1* | 12/2010 | Bombelli | B82Y 10/00 |
| | | | | 435/168 |
| 2011/0180423 | A1* | 7/2011 | Barry | A01K 63/04 |
| | | | | 205/742 |
| 2013/0244123 | A1* | 9/2013 | Palmore | B82Y 10/00 |
| | | | | 429/401 |
| 2013/0337152 | A1* | 12/2013 | Li | H01M 14/005 |
| | | | | 427/74 |

* cited by examiner

SELF-BIASED AND SUSTAINABLE MICROBIAL ELECTROHYDROGENESIS DEVICE

CROSS-REFERENCE TO RELATED APPLICATIONS

This application is a 371 of PCT/US2014/042091 filed on Jun. 12, 2014. PCT/US2014/042091 filed on Jun. 12, 2014 claims the benefit of U.S. Provisional Application 61/837,572 filed on Jun. 20, 2013.

STATEMENT OF GOVERNMENT SPONSORED SUPPORT

This invention was made with Government support under contract no. CBET 1034222 awarded by the National Science Foundation. The Government has certain rights in the invention.

FIELD OF THE INVENTION

This invention relates generally to hydrogen gas production. More specifically, the invention relates to self-sustained hydrogen gas production.

BACKGROUND OF THE INVENTION

With the drastic increase of human population, there is an ever-growing demand for energy and clean water for the continuous economic growth and suitable inhabitation on earth. Millions of tons of wastewater are produced from industrial and agricultural operations each year, and about 25 billion U.S. dollars are spent annually for wastewater treatment in the United States alone. It is highly desirable to employ energy-efficient processes for wastewater treatment and simultaneously recover the energy contained as organic matter in wastewater. It has been thought that this can possibly be achieved by microbial fuel cell (MFC) technology. MFCs are bioelectrochemical devices, where electrogenic bacteria are used to oxidize the organic matter, transfer the electrons to an electrode, and generate electrical energy. In addition to bioelectricity, the electrons produced by the microorganisms can also be used to produce various chemical fuels, depending on the electron acceptors used in the catholyte.

When protons serve as terminal electron acceptors, hydrogen gas will be produced at the cathode. While the microbial electrohydrogenesis process has been experimentally demonstrated using a wide range of microorganisms with various organic nutrients, thermodynamics constraints limit microbial electrogenesis and hydrogen production occurs simultaneously without the addition of an external bias. To overcome the thermodynamic constraints and to compensate for the energy loss during the operation (e.g., due to electrical resistance of the device), an external bias of 0.2 to 1.0 V is needed to sustain the current/hydrogen generation. Nevertheless, the requirement of external bias adds to the complexity and cost for hydrogen production, prohibiting it as a cost effective energy solution. Considerable efforts have been made to minimize the energy loss through the optimization of MFC reactors, electrodes, as well as the type of metal catalysts on the cathode. It has also been reported that microbial electrohydrogenesis can be driven by a solar cell or another MFC.

What is needed is a device that produces bioelectricity at zero external potential, which can generate hydrogen gas at zero external bias using biodegradable organic matter and solar light as the only energy sources.

SUMMARY OF THE INVENTION

To address the needs in the art, a hybrid photoelectrochemical and microbial fuel cell device is provided that includes a single-chamber photoelectrochemical device having an n-type $TiO_2$ photoanode and a Pt counter electrode in an aqueous electrolyte solution, and a dual-chamber microbial fuel cell device having an anode chamber and a cathode chamber, where the anode chamber is separated from the cathode chamber by a cation exchange membrane, where the anode chamber includes a carbon anode and the cathode chamber includes Pt-loaded carbon cathode, where the anode chamber includes microorganisms, where the carbon anode is electrically connected to the Pt counter electrode, where the Pt-loaded carbon cathode is electrically connected to the $TiO_2$ photoanode, where a light source creates photoexcited electron-hole pairs at the $TiO_2$ photoanode that are separated by an electric field at an interface of the $TiO_2$ photoanode and the electrolyte solution, where the holes oxidize water into oxygen, where electrons flow from the $TiO_2$ photoanode to the Pt-loaded carbon cathode, where dissolved oxygen in the cathode chamber is reduced, where the microorganisms oxidize and produce bioelectrons, where the bioelectrons are transferred to the Pt electrode and reduce protons to form hydrogen gas.

According to one aspect of the invention, the aqueous electrolyte solution includes a $Na_2SO_4$ aqueous electrolyte solution.

In another aspect of the invention, the Pt-loaded carbon cathode comprises a Pt-loaded carbon cloth cathode.

In a further aspect of the invention, the carbon anode comprises a carbon cloth anode.

According to another aspect of the invention, the microorganisms include biomass.

In yet another aspect of the invention, the microorganisms include municipal wastewater.

In one aspect of the invention, the $TiO_2$ photoanode includes a $TiO_2$ nanowire-arrayed photoanode.

According to another aspect of the invention, the dual-chamber microbial fuel cell device includes an air cathode dual-chamber microbial fuel cell device.

In a further aspect of the invention, the microorganisms include a mixed population of anaerobic and aerobic microorganisms.

DETAILED DESCRIPTION

The current invention provides a device for continuous, self-sustained hydrogen gas production based solely on solar light and biomass (wastewater) recycling, by coupling solar water splitting and microbial electrohydrogenesis in a photoelectrochemical cell microbial fuel cell (PEC-MFC) hybrid device. In one embodiment, the PEC device is composed of a $TiO_2$ nanowire-arrayed photoanode and a Pt cathode. In a further embodiment the MFC is an air cathode dual-chamber device, inoculated with either *Shewanella oneidensis* MR-1 (batch-fed on artificial growth medium) or natural microbial communities (batch-fed on local municipal wastewater). Under light illumination, the $TiO_2$ photoanode provides a photovoltage of V that shifted the potential of the MFC bioanode to overcome the potential barrier for microbial electrohydrogenesis. As a result, under light illumination (AM 1.5G, 100 mW/cm$^2$) without external bias, and using wastewater as the energy source, pronounced current generation is provided as well as continuous production of hydrogen gas. The successful demonstration of such a self-biased, sustainable microbial device for hydrogen generation provides a new solution that simultaneously addresses the need of wastewater treatment and the increasing demand for clean energy.

Figure 1:
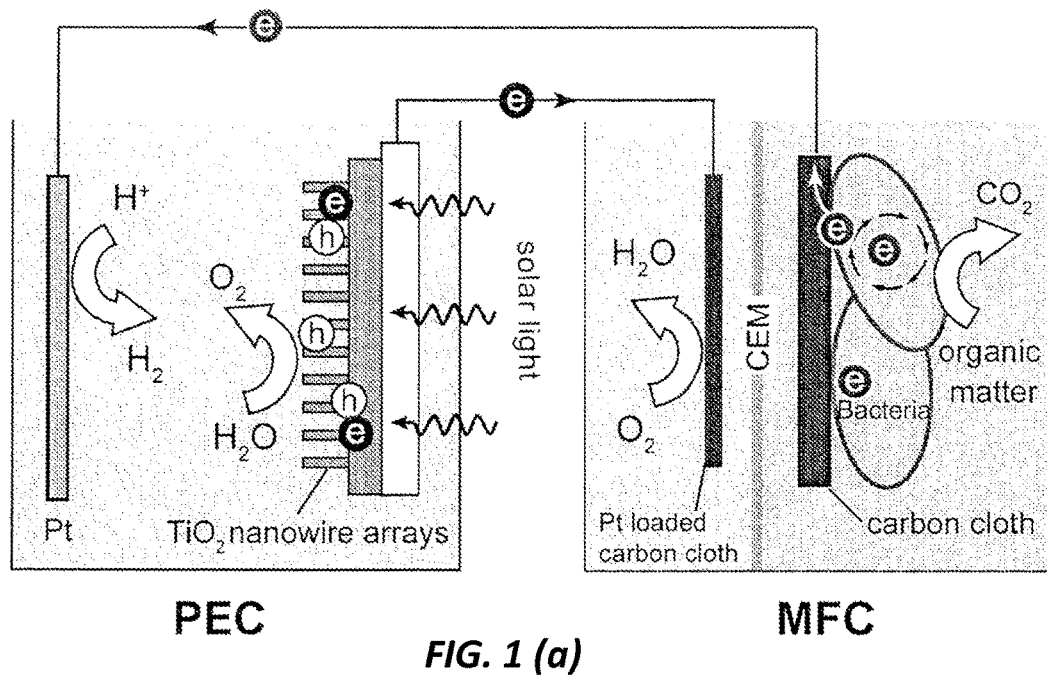
FIGS. 1a-1b show 1a a schematic configuration of a PEC-MFC device, and 1b corresponding energy diagram illustrates the carrier generation and transfer in this hybrid device, according to one embodiment of the invention.
Figure 1:
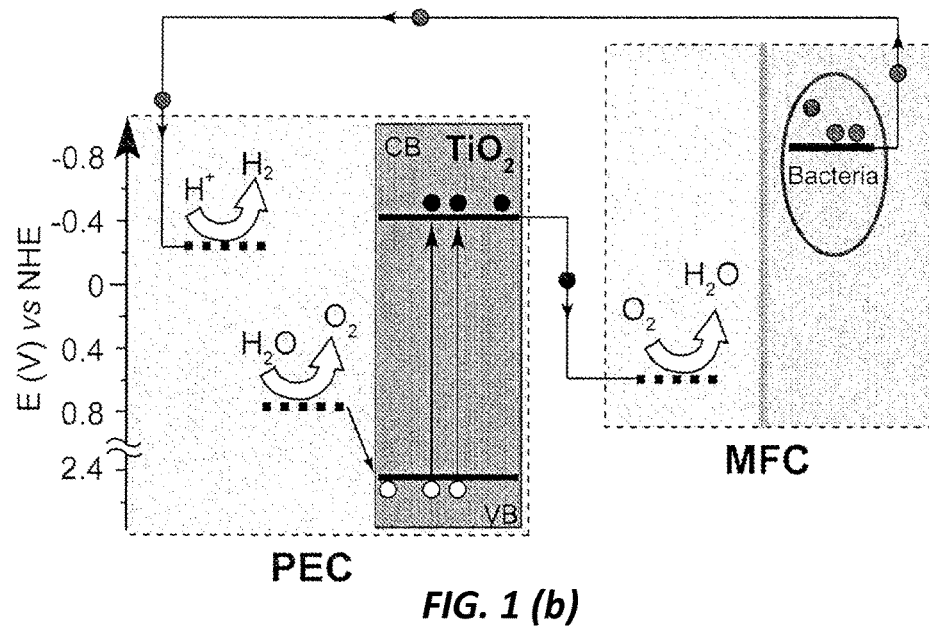

In one embodiment, the configuration of the PEC-MFC device is shown in FIG. 1a. The device is composed of a single-chamber PEC and an air cathode dual chamber MFC. The MFC has an anode and a cathode chamber that was separated by a cation exchange membrane (CEM). Plain and Pt-loaded carbon cloth was used as anode and cathode electrodes in the MFC, respectively. According to one embodiment, the MFC was inoculated with either *Shewanella oneidensis* MR-1 or endogenous microorganisms from the municipal wastewater. In a further embodiment, the PEC includes an n-type $TiO_2$ nanowire-arrayed photoanode and a Pt counter electrode, filled with 0.5 M $Na_2SO_4$ aqueous solution as electrolyte. The MFC bioanode is connected to the PEC Pt electrode, while the MFC cathode is connected to the PEC $TiO_2$ photoanode. Upon light illumination, photoexcited electron-hole pairs are created at the $TiO_2$ photoanode and subsequently separated by the electric field at the anode/electrolyte interface. The holes stay at the surfaces of $TiO_2$ nanowires and oxidize water into oxygen. The electrons flow through the external circuit to the MFC cathode, where they reduce the dissolved oxygen in the MFC catholyte to water. Meanwhile, the electrogenic bacteria in the MFC oxidize the organic matter and produce bioelectrons, which are then transferred to the Pt counter of the PEC and reduce protons to hydrogen gas. FIG. 1b shows the simplified energy diagram of the PEC-MFC device and the electron transfer pathway. Note the photovoltage generated by the $TiO_2$ photoanode shift the electrochemical potentials of MFC electrodes to a more negative value, so that the electrons generated at the MFC bioanode can reduce protons in the PEC chamber. Distinct from a conventional PEC that uses photoexcited electrons to produce hydrogen, the hydrogen production in the PEC-MFC device is sustained by the microbe producing electrons. According to one embodiment, the device aims to incorporate solar energy to boost the reduction capability of the bioanode, so that microbial electrohydrogenesis can be realized at zero external bias.

Figure 2:
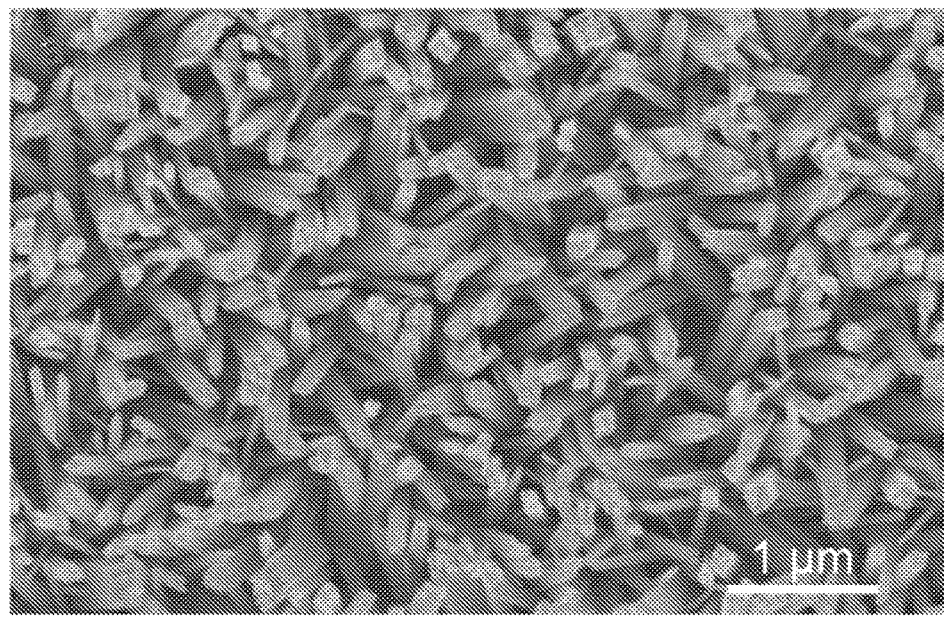
FIGS. 2a-2b show 2a a SEM image of $TiO_2$ nanowire arrays grown on a FTO substrate, and 2b a linear sweep voltammogram collected for TiO2 nanowire-arrayed photoanode in a 0.5 M $Na_2SO_4$ aqueous solution in the dark and under illumination (150 W xenon lamp coupled with AM 1.5G filter, 100 mW/cm2), at a scan rate of 20 mV/s, where the inset is a magnified linear sweep voltammogram around zero bias, according to one embodiment of the invention.
Figure 2:
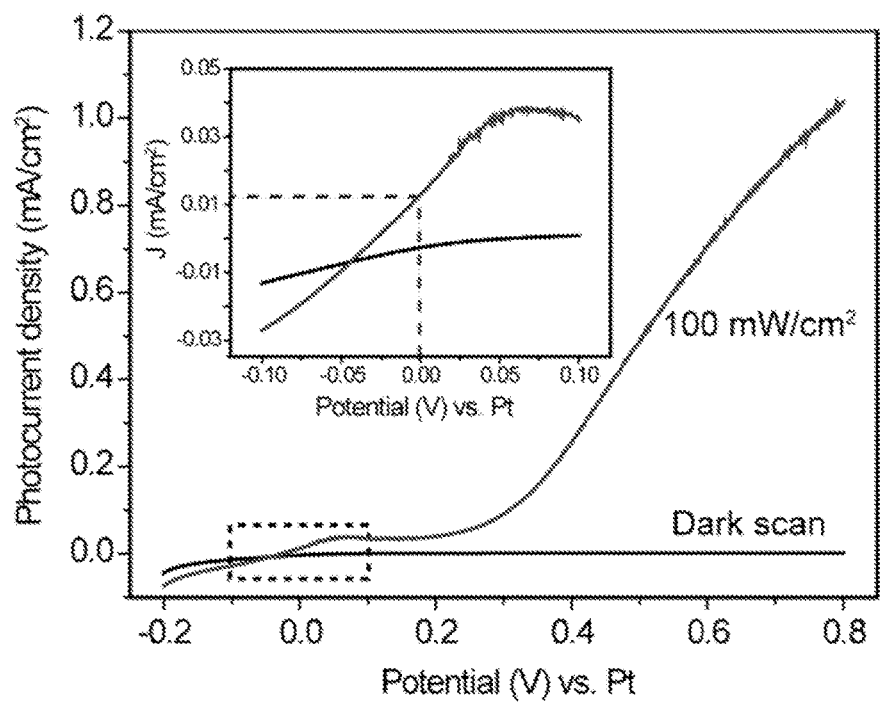

PEC and MFC devices were assembled and tested separately before integrating them into the hybrid device. For the PEC device, $TiO_2$ nanowires were used as the photoanode material because it is a preferred electrode material for PEC water oxidation, due to its favorable band-edge positions, excellent chemical stability, and low cost. In addition, its one-dimensional structure provides an extremely large surface area for PEC water oxidation. Dense and vertically aligned $TiO_2$ nanowire arrays were grown on a fluorine doped tin oxide (FTO)-coated glass substrate by hydrothermal synthesis. Scanning electron microscopy (SEM) images collected from the growth substrate revealed a high-density growth of $TiO_2$ nanowire arrays (FIG. 2a). The nanowires have an average diameter of 100-200 nm and an average length of 2-3 μm. X-ray diffraction (XRD) data collected from $TiO_2$ nanowire film can be indexed to the characteristic peaks of tetragonal rutile $TiO_2$. PEC performance of the $TiO_2$ nanowire films was measured in a 0.5 M $Na_2SO_4$ aqueous solution (pH 7.0) in a two-electrode configuration using an electrochemical station coupled with a solar simulator with a Pt wire as the counter electrode. As shown in FIG. 2b, the $TiO_2$ nanowire photoanode reveals pronounced photoresponse under 1 sun illumination (AM 1.5G, 100 mW/cm$^2$). At zero external bias (0 V vs Pt), the PEC device yielded a photocurrent density of 0.013 mA/cm$^2$. Gas bubbles were not observed at either electrode due to the low photocurrent.

Figure 3:
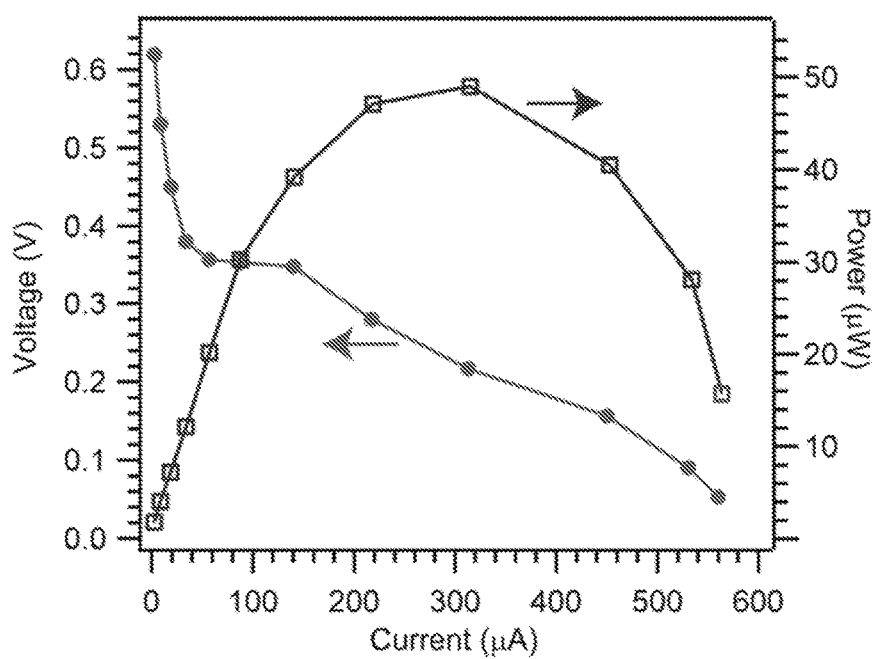
FIGS. 3a-3b show 3a Polarization and power curves collected from a typical ferricyanide cathode MFC device inoculated with MR-1, and 3b SEM image of a carbon cloth electrode colonized by MR-1, where the scale bar is 5 μm, according to one embodiment of the invention.
Figure 3:
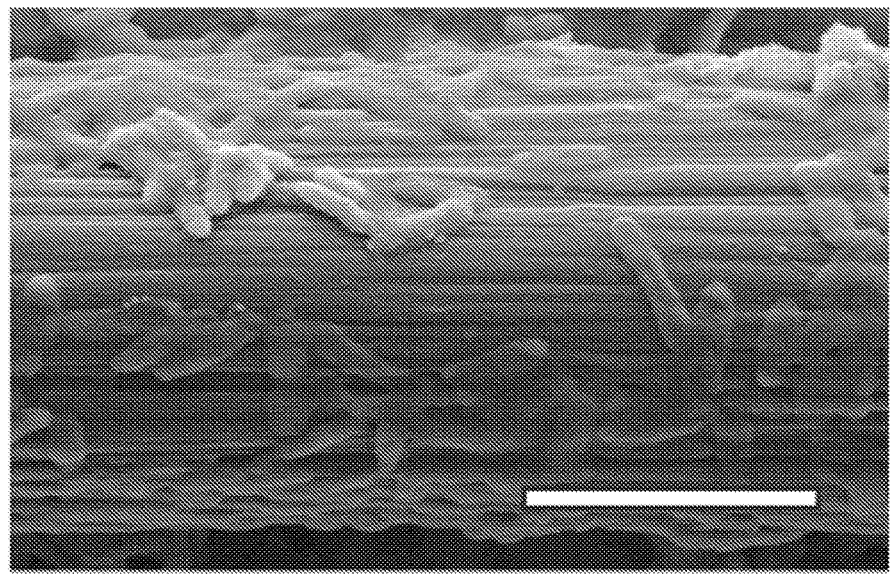

For proof of concept, types of MFCs were fabricated, which were then assembled into the PEC-MFC device. Initially a 30 mL ferricyanide cathode dual-chamber MFC was fabricated, which was inoculated with a pure strain of *Shewanella oneidensis* MR-1 (ATCC 700550) grown in trypticase soy broth (TSB, BD Biosciences, San Jose, Calif.). Buffered ferricyanide was supplied as catholyte. This MFC generated an open circuit voltage between 0.60 and 0.75 V. To monitor current generation, the MFCs were connected to a 1 K ohm external load and operated in a batch mode. In each feeding cycle, a current of 0.1-0.6 mA was generated, which lasted for ca. 20 h before decreasing to the baseline. Replenishment of fresh TSB medium led to a drastic current restoration, and bioelectricity generation was sustained for another 20 h. Polarization and power characterization revealed that these MFCs worked in the ohmic region and generated a peak power of 50 μW at a current of 0.3 mA (FIG. 3a). SEM images of the bioanode after a few days of operation revealed that MR-1 cells grew on the carbon cloth electrode (FIG. 3b).

Figure 4:
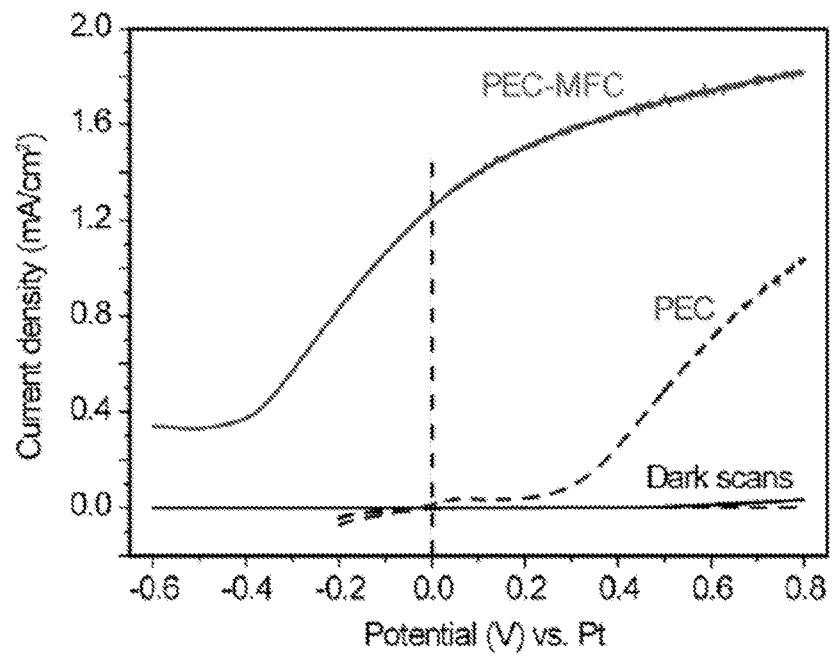
FIGS. 4a-4d show 4a a linear sweep voltammograms collected from a PEC device and a PEC-MFC device at a scan rate of 20 mV/s in the dark and under white light illumination (AM 1.5G, 100 mW/cm$^2$), where the MFC device has a MR-1 colonized bioanode inoculated in TSB growth medium (anolyte) and a carbon cloth cathode with ferricyanide solution as catholyte, and the PEC has a $TiO_2$ nanowire-arrayed photoanode and Pt wire as counter electrode in $Na_2SO_4$ electrolyte, and 4b Amperometric I-t curves recorded for the PEC-MFC device and the PEC device at 0 V vs Pt, with light on-off cycles, and 4c a plot of gas production of the PEC-MFC device as a function of time, at 0 V vs Pt in 0.5 M $Na_2SO_4$ electrolyte, where the inset shows a digital image showing gas bubbles evolving from the Pt electrode during operation, and 4d a corresponding current-time profile obtained for the PEC-MFC device during gas collection, according to one embodiment of the invention.
Figure 4:
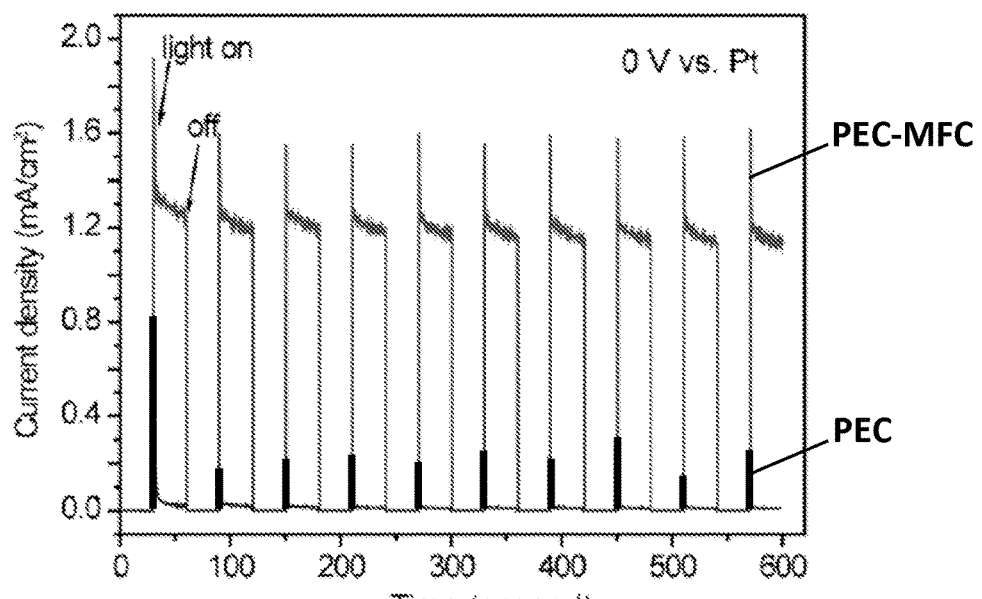
Figure 4:
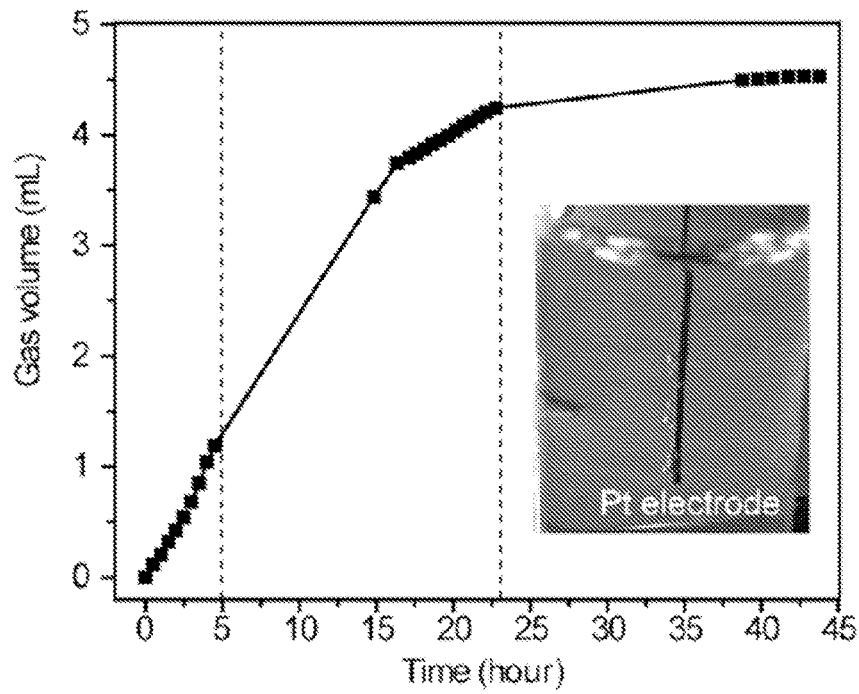
Figure 4:
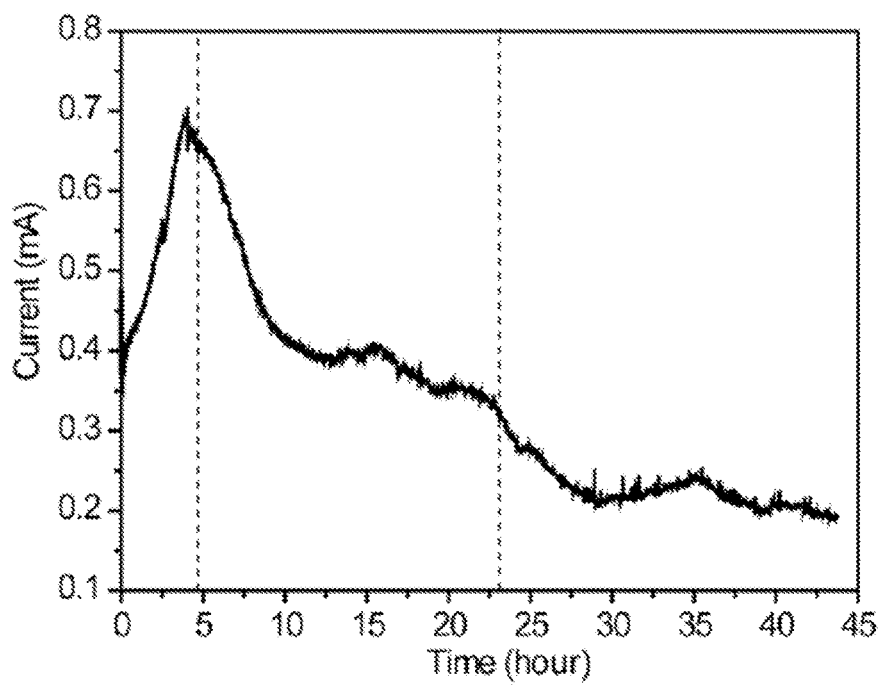

To validate the concept of a PEC-MFC device, the MFC was interfaced with the PEC device by connecting the MFC bioanode to the PEC Pt cathode and the MFC cathode to the PEC TiO2 photoanode (light projected area of 1.5-2.0 cm$^2$), respectively (FIG. 1a). FIG. 4a shows the linear sweep voltammograms collected from a representative PEC-MFC device in the dark and under 1 sun illumination. Significantly, the PECMFC device exhibited a remarkable current density of ~1.25 mA/cm$^2$ at zero bias (0 V vs Pt), which is substantially larger than the value of 0.013 mA/cm$^2$ obtained for the PEC alone at the same potential. FIG. 4b shows the amperometric I-t curves recorded for the PEC and PEC-MFC devices at 0 V versus Pt with light on/off cycles. The current spikes occurred when the light was turned on, and then a steady-state current was obtained after several seconds of settling. This transient effect during power excitation could be due to the inefficient charge separation and transfer at the interface between the TiO$_2$ electrode and the electrolyte at zero bias. Significantly, the PEC-MFC device showed reproducible photocurrent generation in response to light illumination. There was no obvious current drop within 600 s. These results suggest that the PEC-boosted microbial electrohydrogenesis was feasible and efficient. By coupling the MFC and PEC devices in series, the illuminated TiO$_2$ photoanode provided a photovoltage that shifted the potential of the MFC bioanode to a more negative value, and therefore, microbial electrohydrogenesis can occur at zero external bias (bioelectrons reduce protons to hydrogen gas). In other words, the MFC device served as a battery, which provided extra voltage for PEC hydrogen generation and shifted the entire current-voltage (I-V) curve to a more negative potential. The potential shift was measured to be around 0.7 V by comparing the onset potentials observed in I-V curves collected from the PEC and PEC-MFC devices. The solar-to-hydrogen (STH) conversion efficiency (η) of the PEC-MFC device can be calculated using the equation $$\eta = I(1.23-V)/J_{light}$$

where 1.23 V is the theoretical potential for water splitting, V is the potential between the photoanode and Pt cathode, I is the photocurrent density at the measured potential, and $J_{light}$ is the irradiance intensity of 100 mW/cm$^2$ (AM 1.5 G). This hybrid device exhibits a STH conversion efficiency of 1.54% at 0 V versus Pt. Considering the fact that the theoretical STH efficiency of rutile TiO$_2$ is 2.3% under 1 sun illumination, given a band gap energy of 3.0 eV, thus the integration of PEC and MFC devices has enabled a high photoconversion efficiency of the TiO$_2$ electrode. More importantly, gas bubbles were observed to be continuously evolving on both the Pt electrode and TiO$_2$ photoanode under light illumination (FIG. 4c, inset), indicative of hydrogen and oxygen generation. The gas bubbles were collected from the PEC device by a syringe and analyzed by gas chromatography, confirming the presence of H2. The H$_2$/O$_2$ ratio was not qualified due to the limitation of the instruments. FIG. 4c, FIG. d shows the plots of gas volume produced (mixture of H$_2$ and O$_2$) and current (0 V vs Pt) as a function of time, respectively. Within the initial 5 h, the gas volume increased rapidly with the increase of the PEC-MFC device current; the gas production slowed when the current started to decline at later time points, due to the decreased activity of microorganisms as a result of depletion of nutrient in anolyte. After 45 h, the current decreased to baseline and the gas production ceased. On the basis of these results, it was unambiguously demonstrated that hydrogen generation results from a self-biased, PEC-MFC device.

Figure 5:
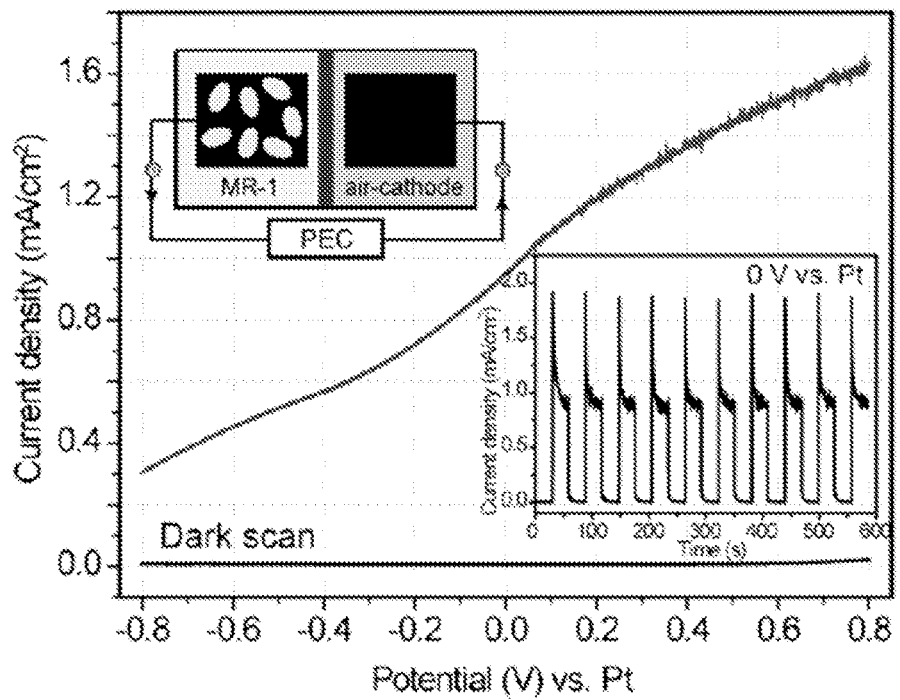
FIGS. 5a-5b show 5a linear sweep voltammograms collected from a PEC-MFC device with air cathode and with *S. oneidensis* MR-1 in TSB medium, at a scan rate of 20 mV/s in the dark and under white light illumination of 100 mW/cm$^2$, where the insets show a schematic diagram of the PEC-MFC device and the corresponding amperometric I-t curve recorded for the PECMFC device at 0 V vs Pt with light on-off cycles, and 5b a current density vs time plot collected for the MFC-PEC device, operated in a batch-fed mode at 0 V vs Pt under the light illumination of 100 mW/cm$^2$, according to one embodiment of the invention.
Figure 5:
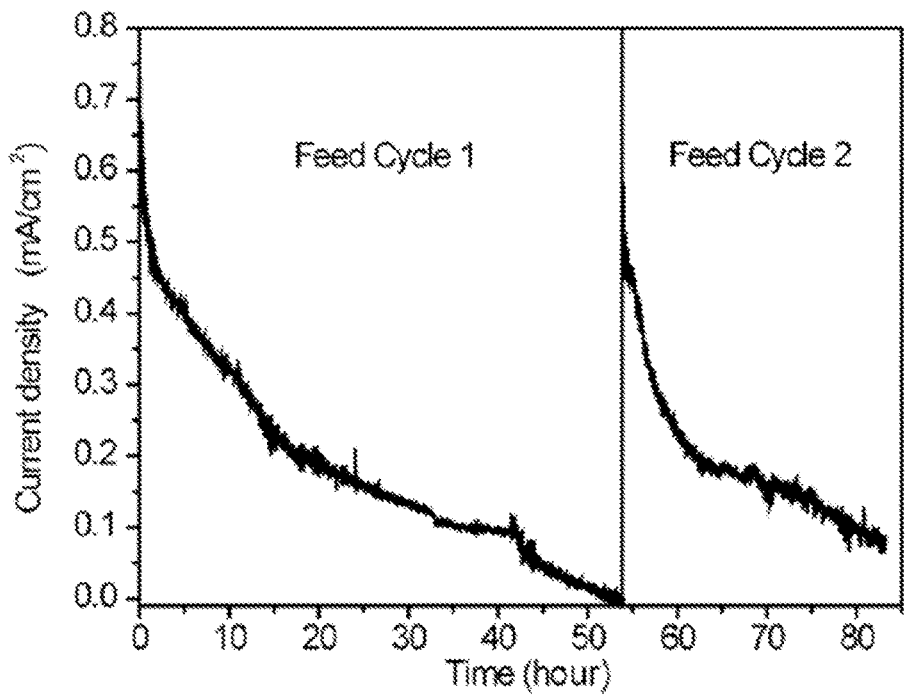

For practical applications, the sustainability of self-biased PEC-MFC devices is equally important to their electrochemical performance. While ferricyanide solution is an excellent catholyte for MFC devices, it is not renewable in practice and its production and use may cause environmental issues. Alternatively, oxygen can be used as an electron acceptor, which has been demonstrated in a variety of air cathode MFCs. Using an air cathode MFC, according to one embodiment, eliminates the need for chemicals (e.g., ferricyanide) and, therefore, can increase sustainability, reduce cost, and minimize the environmental impact of MFCs. To fabricate air cathode MFCs, a Pt nanoparticle-decorated carbon cloth (electrode 40% of Pt on carbon cloth, 0.5 mg/cm$^2$, Fuel Cell Earth, LLC, Stoneham, Mass.) is employed as cathode to increase the efficiency of oxygen reduction. The MFC was inoculated with MR-1 cells and fed with TSB medium. Linear sweep voltammograms were collected for the air cathode PEC-MFC device in the dark and under 1 sun illumination (FIG. 5a). In comparison to the PEC-MFC device with ferricyanide solution as catholyte, the air cathode device exhibited slightly lower current density at the same potential. Although oxygen reduction should be more thermodynamically favorable (reduction potential 0.8 V vs NHE at pH 7.0) than the reduction of ferricyanide (0.4 V vs NHE at pH 7.0), the low concentration of dissolved oxygen and low oxygen mass transfer in water limit the rate of oxygen reduction and, thereby, the current density. The current generation was recorded as a function of time for an air cathode PEC-MFC device operated in a batch-fed mode at 0 V versus Pt under light illumination. FIG. 5b shows the continuous current generation from the PEC-MFC device in two consecutive feeding cycles (under light illumination), which lasted for more than 80 h. The current decreased gradually due to the depletion of nutrients in the MFC, and the replenishment of fresh TSB medium led to current restoration. These results indicate that the overall current generation is determined by the MFC performance, which varies depending on the microbial activities of the bioanode. Importantly, the sustainability measurements indicate that the PEC-MFC device has the potential to be operated on a long time scale with continuous supply of organic substrates and light illumination.

Figure 6:
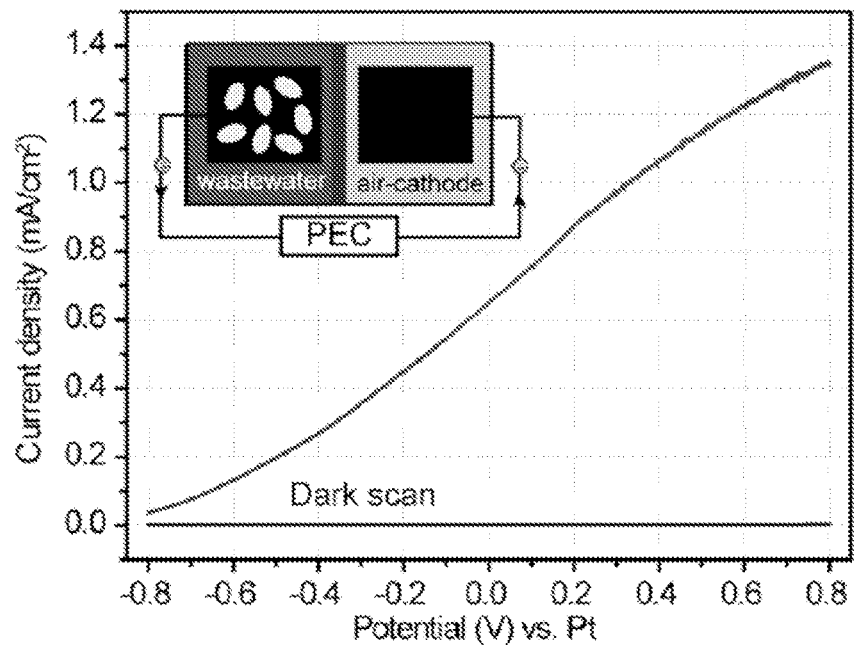
FIGS. 6a-6d show 6a a linear sweep voltammogram collected for PEC-MFC device with air cathode and wastewater as anolyte, at a scan rate of 20 mV/s in the dark and under white light illumination of 100 mW/cm$^2$, where the insets show a schematic diagram of the PEC-MFC device, 6b an Amperometric I-t curve recorded for the PEC-MFC device at 0 V vs Pt with light on-off cycles, 6c and 6d show a plot of gas production and current generation of the PEC-MFC device operated at 0 V vs Pt as a function of time, according to one embodiment of the invention.
Figure 6:
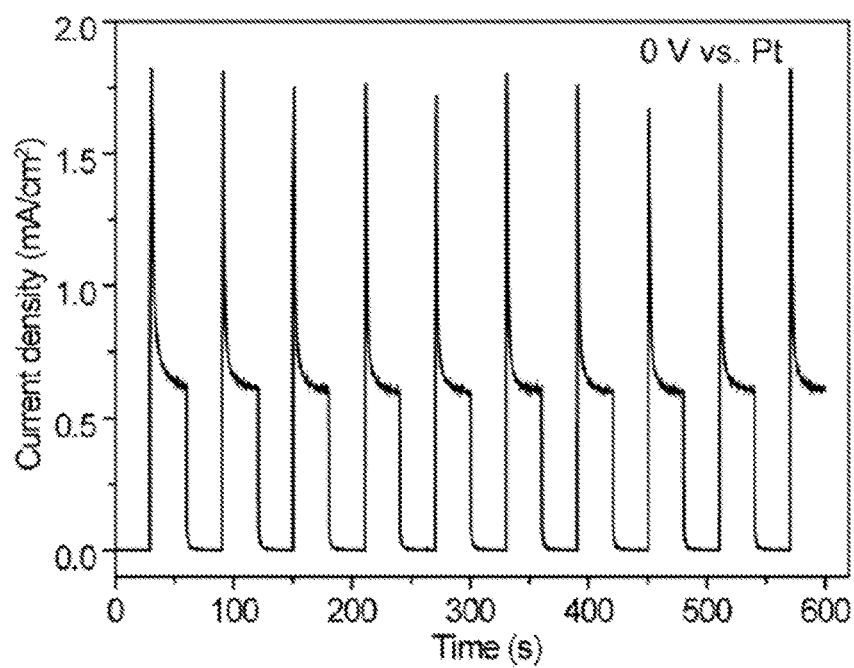
Figure 6:
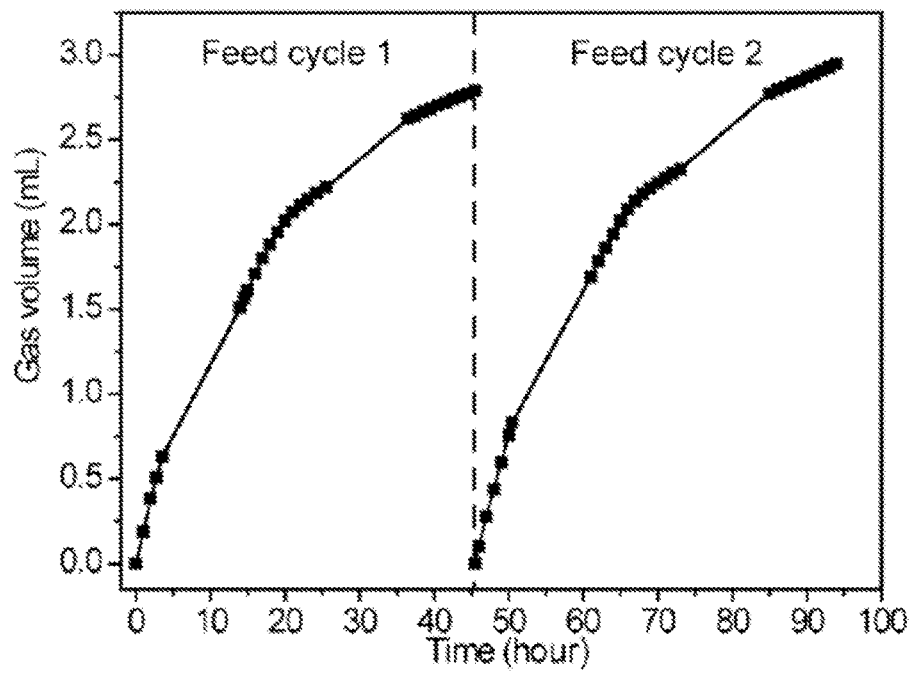
Figure 6:
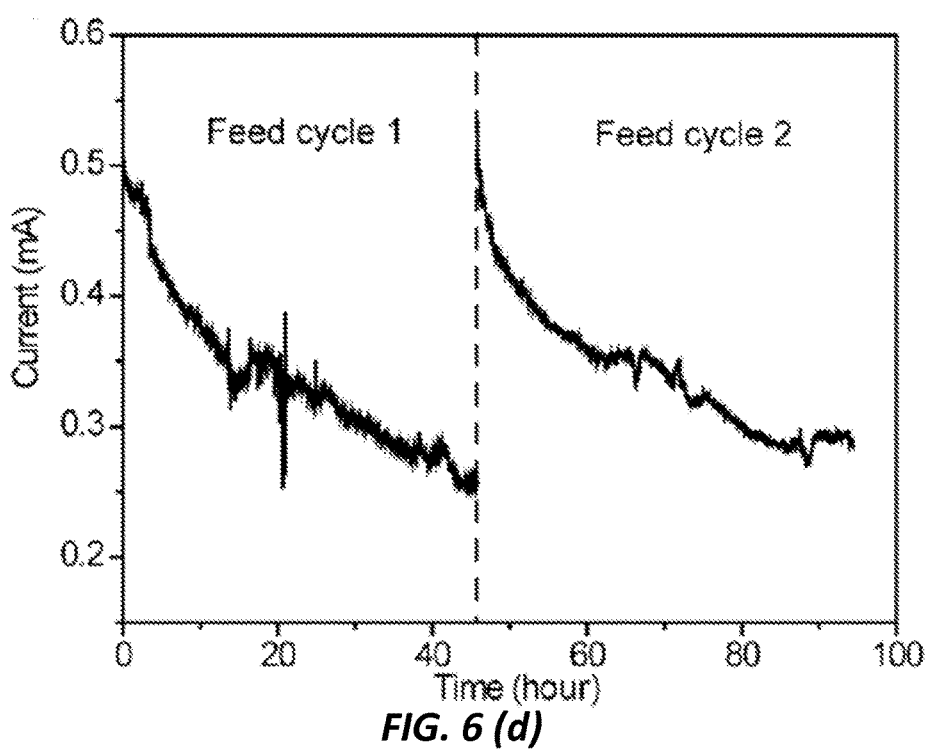

On the basis of the success of the proof-of-concept device, a further step was taken to replace the MFC anolyte of *S. oneidensis* MR-1 artificial growth medium with municipal wastewater collected from the Livermore Water Reclamation Plant (Livermore, Calif., USA) that contains mixed microbial populations of anaerobic and aerobic sludge. A mixture of anaerobic and aerobic sludge at 1:1 volume ratio was used to inoculate the air cathode MFC. Linear sweep voltammograms were collected from the air cathode PEC-MFC device fed with wastewater in the dark and under light illumination of 100 mW/cm$^2$ (FIG. 6a). Significantly, the device also showed pronounced current at 0 V versus Pt, indicative of an efficient supply of bioelectrons from the wastewater MFC (FIG. 6b). By using wastewater as anolyte, the PEC-MFC showed reduced current in comparison to the device with MR-1 in the TSB anolyte, at the same potential, which could be attributed to the relatively large electrolyte resistance (low conductivity) of the wastewater. More importantly, we observed continuous evolution of $H_2$ bubbles from the Pt electrode at 0 V versus Pt under light illumination. FIG. 6c and FIG. 6d shows the plot of gas production and current of a PEC-MFC device as a function of time. In each feeding cycle, the device started with a high initial gas generation rate and then decreased with the decease of current, as a result of depletion of nutrient in the wastewater of the MFC device. The replenishment of wastewater led to a complete restoration of current generation and gas production. These results proved that the PEC-MFC hybrid device is sustainable with the continuous supply of sunlight and wastewater. Moreover, the municipal wastewater has a measured soluble chemical oxygen demand (SCOD) of 500-600 mg/L. After the device operated for ~48 h, the SCOD value decreased to ~200 mg/L. This yielded a Coulombic efficiency of 64%, which is comparable to that of previously reported wastewater MFCs with Coulombic efficiency ranging from 40 to 90%. Taken together, we demonstrate the nonbiased and sustainable microbial electrohydrogenesis process by coupling MFC and PEC devices, which only requires the supply of solar light and wastewater as energy sources, and can not only generate electricity and hydrogen gas but also treat wastewater at the same time.

The current invention provides a self-biased, sustainable PEC-MFC hybrid device for electricity and hydrogen generation, using wastewater and solar light as the only energy sources. By integrating an MFC device with a PEC device, the PEC device provides photovoltage that enables microbial electrohydrogenesis to occur without the need for an additional electrical bias. The results from this study provide new insights into the development of efficient energy solutions by integrating solar and microbial technology and may revolutionize the conventional wastewater treatment methodologies currently applied nationwide.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example various types of microorganisms can be used in the microbial fuel cell device; different kinds of cation exchange membrane can be used in the microbial fuel cell device; different types of aqueous electrolyte solutions can be used the photoelectrochemical device, in different types of metal or semiconductor electrodes can be used in the microbial fuel cell and photoelectrochemical devices.

All such variations are considered to be within the scope and spirit of the present invention as defined by the following claims and their legal equivalents.

What is claimed:

1. A hybrid photoelectrochemical and microbial fuel cell device, comprising:
   a. a single-chamber photoelectrochemical device, wherein said single-chamber photoelectrochemical device comprises an n-type $TiO_2$ photoanode and a Pt counter electrode in an aqueous electrolyte solution, and;
   b. a dual-chamber microbial fuel cell device, wherein said dual-chamber microbial fuel cell device comprises an anode chamber and a cathode chamber, wherein said anode chamber is separated from said cathode chamber by a cation exchange membrane, wherein said anode chamber comprises a carbon anode and said cathode chamber comprises Pt-loaded carbon cathode, wherein said anode chamber comprises microorganisms, wherein said carbon anode is electrically connected to said Pt counter electrode, wherein said Pt-loaded carbon cathode is electrically connected to said $TiO_2$ photoanode, wherein a light source creates photoexcited electron-hole pairs at said $TiO_2$ photoanode that are separated by an electric field at an interface of said $TiO_2$ photoanode and said electrolyte solution, wherein said holes oxidize water into oxygen, wherein electrons flow from said $TiO_2$ photoanode to said Pt-loaded carbon cathode, wherein dissolved oxygen in said cathode chamber is reduced, wherein said microorganisms oxidize and produce bioelectrons, wherein said bioelectrons are transferred to said Pt electrode and reduce protons to form hydrogen gas.

2. The hybrid photoelectrochemical and microbial fuel cell device of claim 1, wherein said aqueous electrolyte solution comprises a $Na_2SO_4$ aqueous electrolyte solution.

3. The hybrid photoelectrochemical and microbial fuel cell device of claim 1, wherein said Pt-loaded carbon cathode comprises a Pt-loaded carbon cloth cathode.

4. The hybrid photoelectrochemical and microbial fuel cell device of claim 1, wherein said carbon anode comprises a carbon cloth anode.

5. The hybrid photoelectrochemical and microbial fuel cell device of claim 1, wherein said microorganisms comprise biomass.

6. The hybrid photoelectrochemical and microbial fuel cell device of claim 1, wherein said microorganisms comprise municipal wastewater.

7. The hybrid photoelectrochemical and microbial fuel cell device of claim 1, wherein said $TiO_2$ photoanode comprises a $TiO_2$ nanowire-arrayed photoanode.

8. The hybrid photoelectrochemical and microbial fuel cell device of claim 1, wherein said dual-chamber microbial fuel cell device comprises an air cathode dual-chamber microbial fuel cell device.

9. The hybrid photoelectrochemical and microbial fuel cell device of claim 1, wherein said microorganisms comprises a mixed population of anaerobic and aerobic microorganisms.

* * * * *